(12) United States Patent
Bremer et al.

(10) Patent No.: US 9,887,604 B2
(45) Date of Patent: Feb. 6, 2018

(54) APPARATUS FOR KINETIC ENERGY STORAGE HAVING A FLYWHEEL WITH PUMP-ACTIVE SURFACES

(71) Applicant: Pfeiffer Vacuum GmbH, Asslar (DE)

(72) Inventors: Wolfgang Bremer, Biebertal (DE); Armin Conrad, Herborn (DE)

(73) Assignee: Pfeiffer Vacuum GmbH, Asslar (DE)

( * ) Notice: Subject to any disclaimer, the term of this patent is extended or adjusted under 35 U.S.C. 154(b) by 459 days.

(21) Appl. No.: 14/067,236

(22) Filed: Oct. 30, 2013

(65) Prior Publication Data
US 2014/0125171 A1  May 8, 2014

(30) Foreign Application Priority Data

Nov. 8, 2012   (DE) .................. 10 2012 110 691

(51) Int. Cl.
| | | |
|---|---|---|
| *H02K 7/02* | (2006.01) | |
| *F03G 3/08* | (2006.01) | |
| *F04D 19/04* | (2006.01) | |

(52) U.S. Cl.
CPC .............. *H02K 7/025* (2013.01); *F03G 3/08* (2013.01); *F04D 19/044* (2013.01)

(58) Field of Classification Search
CPC ................................ H02K 7/02; H02K 7/025
USPC ......................................................... 310/74
See application file for complete search history.

(56) References Cited

U.S. PATENT DOCUMENTS

| | | | |
|---|---|---|---|
| 5,462,402 A | 10/1995 | Bakholdin | |
| 5,662,456 A | 9/1997 | Englaender | |
| 5,893,702 A * | 4/1999 | Conrad | ................. F04D 19/046 415/71 |
| 6,347,925 B1 * | 2/2002 | Woodard | ............... H02K 7/025 310/74 |
| 8,030,787 B2 | 10/2011 | Kalev | |
| 9,077,211 B2 | 7/2015 | Kalev | |
| 2003/0061898 A1 * | 4/2003 | Brackett | ................ H02K 7/025 74/572.11 |
| 2008/0087133 A1 * | 4/2008 | Potter | .................... H02K 7/025 74/572.1 |
| 2012/0031224 A1 | 9/2012 | Tarrant | |
| 2013/0264914 A1 * | 10/2013 | Kalev | .................... H02K 7/025 310/68 B |

FOREIGN PATENT DOCUMENTS

| | | |
|---|---|---|
| AU | 2006203265 | 8/2006 |
| JP | 57-203878 A | 12/1982 |
| JP | 62-243987 A | 10/1987 |
| JP | 2011-247253 A | 12/2011 |
| WO | 2011155838 | 12/2011 |

\* cited by examiner

*Primary Examiner* — Michael Andrews
(74) *Attorney, Agent, or Firm* — Abelman, Frayne & Schwab

(57) ABSTRACT

An apparatus for kinetic energy storage includes an electrical machine operable at least in one of motor mode and generator mode, and at least one energy recovery system for an intermediate storage of a produced kinetic energy and which converts the kinetic energy into an electrical energy, with, the at least one energy recovery system having at least one flywheel body formed as a rotor, and a stator and with at least one of the rotor and the stator being formed as at least one vacuum pump stage.

5 Claims, 8 Drawing Sheets

APPARATUS FOR KINETIC ENERGY STORAGE HAVING A FLYWHEEL WITH PUMP-ACTIVE SURFACES

BACKGROUND OF THE INVENTION

1. Field of the Invention

The invention relates to an apparatus for kinetic energy storage.

2. Description of the Prior Art

The prior art (DE 102010023531A1) discloses an apparatus for a smart network capacity control by kinetic energy storage.

The apparatus has a flywheel energy accumulator with an electric motor. The drawback of this apparatus consists in that the efficiency of this prior art apparatus for kinetic energy storage is relatively low because this apparatus operates under atmospheric pressure.

The prior at (DE 202011108033U) further discloses an apparatus with at least one energy recovery system for intermediate storage of a produced kinetic energy and which converts the kinetic energy into an electrical energy, wherein the at least one energy recovery system is formed of an electrical machine operable based on a reluctance principle and having a rotor formed as a flywheel body and a stator fixedly connected with the apparatus housing.

This prior art apparatus has actually a vacuumized chamber for minimizing the influence of air friction. In the vacuumized chamber, the flywheel accumulator is located. However, for producing vacuum, an external vacuum pump is provided. To this end, this apparatus requires, as is known from practice, a high vacuum pump and a vacuum pump to generate vacuum necessary in the housing with a flywheel accumulator. Also conceivable are arrangements having only one for vacuum pump, e.g., a two stage rotary vane pump.

The object of the invention is to provide a device for kinetic energy storage which would have a high efficiency with a minimized influence of the air friction in the apparatus, on one hand and, on the other hand, which can do without an upstream high vacuum pump or in which vacuum is improved without an additional high vacuum pump stage.

SUMMARY OF THE INVENTION

The inventive apparatus for kinetic energy storage has an electrical machine operable at least in one of motor mode and generator mode, and at least one energy recovery system for an intermediate storage of a produced kinetic energy and which converts the kinetic energy into an electrical energy, with the at least one energy recovery system having at least one flywheel body formed as a rotor, and a stator and with at least one of the rotor and the stator being formed as at least one vacuum pump stage.

The combination with a rapidly rotatable flywheel body with a suitable geometry enables a pumping action in the molecular region at a pressure ideal for the driving of the flywheel body, and leads to an increased reduction of gas friction.

The inventive apparatus can, e.g., be used in interruption-free current supply systems or also as kinetic energy accumulator for cars and in other fields of application. As an application field, wind energy installations or photovoltaic power systems can be envisaged in which the inventive apparatus can be used to bridge phases in which these installations or systems do not generate any current.

Because the energy recovery system itself is formed as a vacuum pump, the advantage of the inventive apparatus consists in that it is located in the housing, in which the flywheel body moves, with the flywheel body itself generating vacuum. There exists a possibility that the apparatus discharges against the atmospheric pressure. If necessary, a possibility exists, however, to use an inexpensive for vacuum pump. With this inventive construction, a vacuum is generated in the housing in which the flywheel body rotates, whereby the efficiency of the energy accumulator is increased. On the other hand, it is not necessary to provide an expensive high vacuum pump, e.g., a turbo molecular pump upstream of the apparatus. In the best case, additional or upstream pumps can be completely dispensed with. If necessary, the inventive apparatus can be arranged upstream of a booster pump for a turbo molecular pump.

According to a preferred embodiment, the rotor and the stator is formed as at least one of the Holweck-pump stage, Siegbahn pump stage, cross-channel pump stage, and screw-type pump stage.

The advantage of the so formed pump stages consist in that the flywheel accumulator can be so formed, together with the stator, that pump-active surfaces which are formed parallel to a rotational axis of the flywheel accumulator are formed as a screw-type pump stage or as cross-channel pump stage, and that pump-active surfaces which are formed transverse to the rotational axis are formed analogous to a Siegbahn pump stage. In addition at least one cross-channel pump stage can be provided. By combination of different pump stages, it is possible to actively use common pump-relevant surfaces in the apparatus together.

According to a further advantageous embodiment, the rotor is formed as a Holweck sleeve or as a Holweck cylinder. The pump-active channels can be provided in the rotor or in corresponding walls of the stator.

According to a still further advantageous embodiment of the invention, it is contemplated that the flywheel body or the housing has pump-active surfaces which are formed parallel to a rotational axis as a screw-type pump stage or as cross-channel pump stage, and pump-active surfaces which are formed transverse to the rotational axis, are formed as a Siegbahn pump stage. Thereby, the efficiency of the inventive apparatus is noticeably increased.

According to yet another advantageous embodiment of the invention, the flywheel body is formed as one of a rotatable sleeve and a rotatable cylinder. The sleeve or the cylinder is mounted on a hub. The advantage of this embodiment consists in that it is formed of simple and, therefore, inexpensively produced components.

A still another advantageous embodiment contemplates that the hub is formed as a hub a cross-section of which widens toward the flywheel body. In this embodiment, the mass of the flywheel body, which consist of the hub and a cylinder, noticeably increases, whereby the efficiency is likewise increases.

A still further embodiment of the invention contemplates that the flywheel body is formed as a rotatable solid cylinder secured directly on the rotor shaft. In this embodiment, the flywheel body has a very big mass, whereby the efficiency is noticeably increased.

A yet further embodiment of the invention contemplates that the flywheel body is formed of metal and/or fiber-unforced plastic material. When formed of metal, the flywheel body has a very big mass, whereby the energy accumulator is optimized. The advantage of forming the flywheel body of a carbon fiber-reinforced plastic material consists in that that flywheel body can be produced in a simple and cost-effective manner.

The inventive apparatus can have one or more outlets.

As bearings for the rotor shaft, roller bearings and/or active and/or passive magnetic bearings are provided.

The invention both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
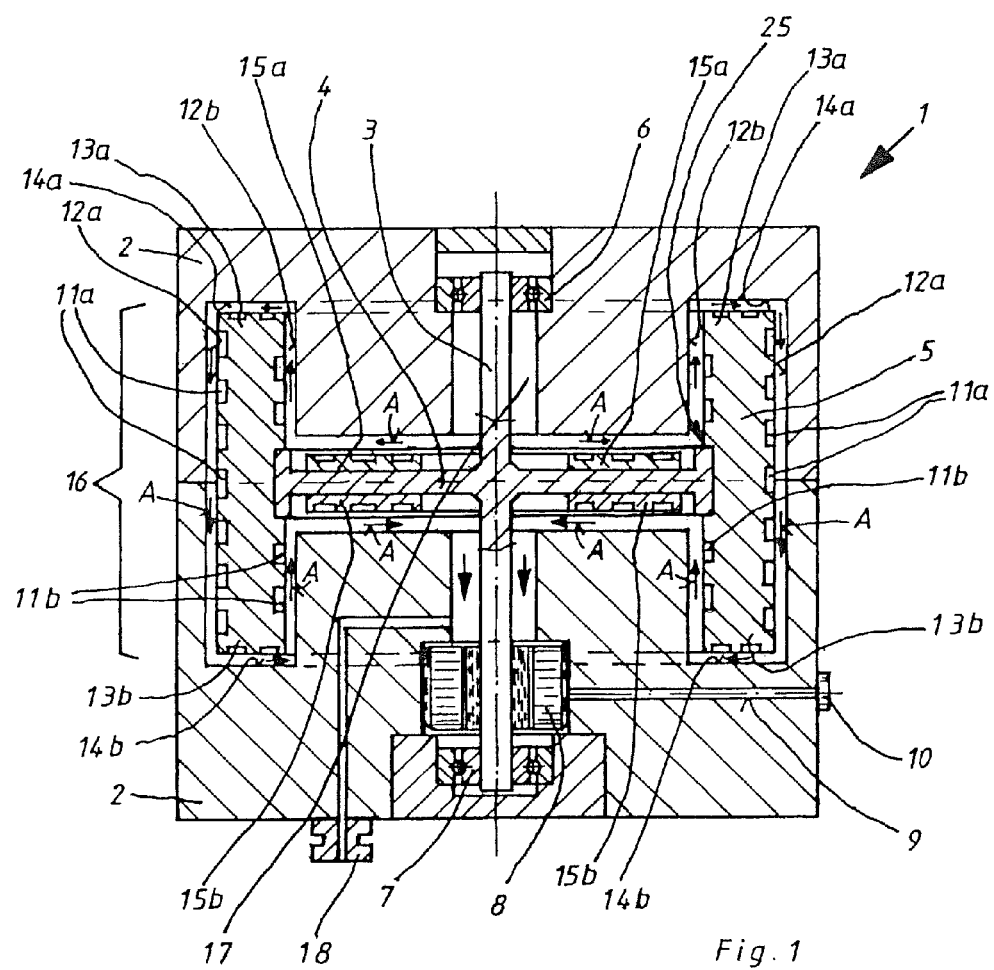
FIG. 1 a longitudinal cross-sectional view of an apparatus according the present invention.

FIG. 1 shows an apparatus 1 for kinetic energy storage and having a housing 2, a rotor shaft 3 which is secured on a hub 4. A flywheel body 5, which is formed as a hollow cylinder, is also arranged on the hub 4. Bearings 6 and 7 rotatably support the rotor shaft 3. An electrical machine 8 that operates either as a motor or as a generator, has an electrical leadthrough 9 leading to an electrical connection 10.

The flywheel body 5 has channels 11a which, together with inner wall 12a of the housing 2, form a screw-type pump stage 16. The screw-type pump stage 16 cooperates with inner walls 12a.

The view in FIG. 1 shows simply an exemplary embodiment. With a Holweck pump stage, pump-active surfaces are arranged in the housing, and the rotor surfaces are formed smooth. With the screw-type pump stage 16, the pump-active surfaces are provided in the rotor surface, and the inner surfaces of the housing are formed smooth. Usually, with a Siegbahn pump stage, pump-active surfaces are provided in the housing, and the rotor is formed smooth. However, the following figures show that in Siegbahn pump stage a design is selected in which pump-active surfaces are provided in the rotor, and the inner wall of the housing is formed smooth. The channels 11b cooperate with an inner wall 12b and form a screw-type pump stage.

Siegbahn pump stages 13a, 13b cooperate with inner walls 14a, 14b. Naturally, another embodiment, not shown, is possible in which the stator surfaces 14a, 14b have grooves corresponding to Siegbahn pump stage and cooperate with corresponding surfaces 13a, 13b of the rotor which are formed smooth.

In addition, further Siegbahn pump stages 15a, 15b are provided on the hub 4. When the rotor shaft 3 is rotated, together with the hub 4 and the flywheel body 5, the screw-type pump stages 11a, 12a, 11b 12b evacuate a hollow space 17 of the housing 2 through the outlet 18. The direction of gas molecules, which are transported by the pump stages, is shown with arrow A. Therefore, the flywheel body 5 can rotate in the evacuated hollow space 17 free from air friction. The rotor 25 of the apparatus 1 is formed of the rotor shaft 3, the hub 4, and the flywheel body 5.

The gas molecules are transported by the Siegbahn pump stages 15a radially outwardly relative to the rotor shaft 3. Further transportation is carried out by the screw-type pump stage that cooperates with the inner wall 12b. Finally, the gas molecules are transported by the Siegbahn pump stage 13a to the channels 11a of the further screw-type pump stage. Further transportation of the gas molecules is carried out from the Siegbahn pump stage 13b in direction of the screw-type pump stage 11b and from there further in direction of the Siegbahn pump stage 15b before the gas molecules are transported to the outlet 18.

Figure 2:
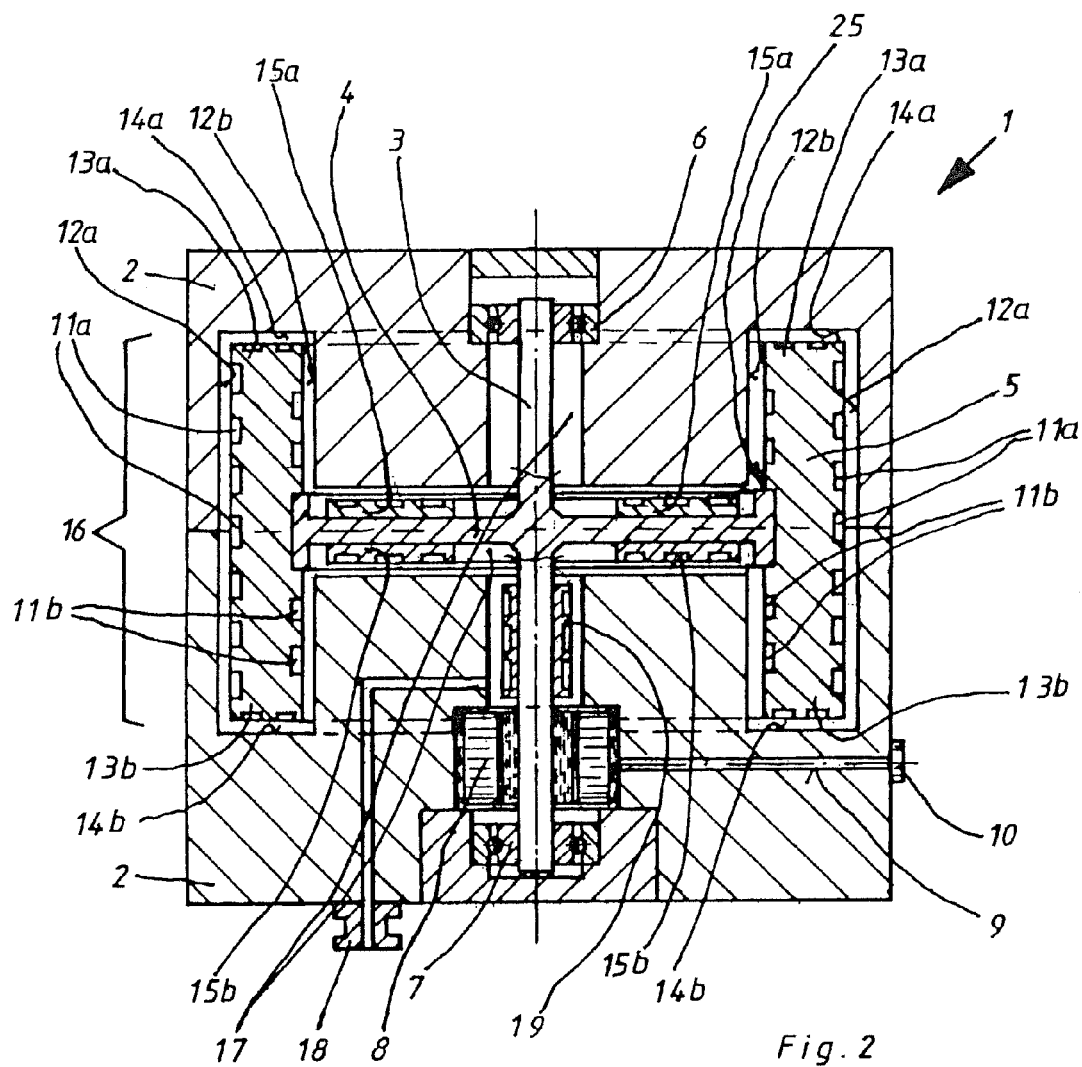
FIG. 2 a longitudinal cross-sectional view of another embodiment of an apparatus according to the present invention.

FIG. 2 shows an embodiment of the apparatus 1 that substantially corresponds to the construction of the apparatus 1 according to FIG. 1. The components common with those of FIG. 1 are designated with the same reference numerals and are not further described. Only substantial changes are described.

According to FIG. 2, an additional screw-type pump stage 19, which increases the pumping capacity of the apparatus 1 is arranged on the rotor shaft 3. At this location, also, a Holweck pump stage with channels provided in the stator or a cross-channel pump stage with opposite channels in the stator and rotor can be arranged.

Figure 3:
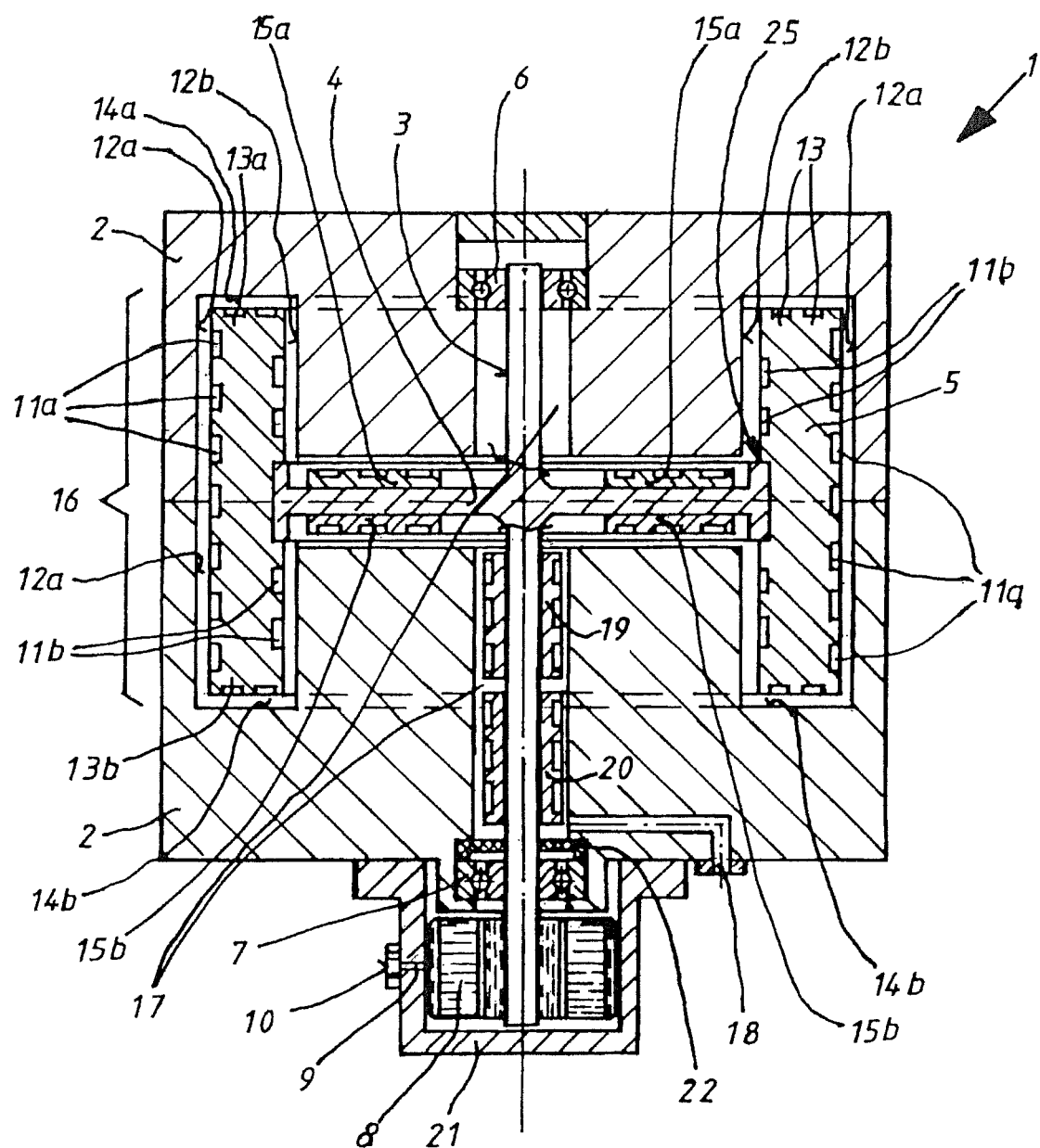
FIG. 3 a longitudinal cross-sectional view of yet another embodiment of an apparatus according to the present invention.

FIG. 3 shows an embodiment of an apparatus 1 in which common components are not described, only substantial changes are.

According to FIG. 3, a further pump stage which is formed as a cross-channel pump stage, is arranged on the rotor shaft 3. In the cross-channel pump stage 20 pump-active surfaces are provided on the rotor and the inner wall of the housing. The pump-active surfaces on the housing inner wall are not shown for better clarity.

In the apparatus 1 according to FIG. 3, the electrical machine 8 is located outside of the housing 2 in a separate housing component 21. The rotor shaft 3 is driven through a mechanical leadthrough 22 that advantageously has a seal. Thus, the electrical machine 8 is located outside of the housing 2.

The inlet 18, in distinction from the embodiments of FIGS. 1 and 2, is located in the vicinity of the rotor shaft.

Figure 4:
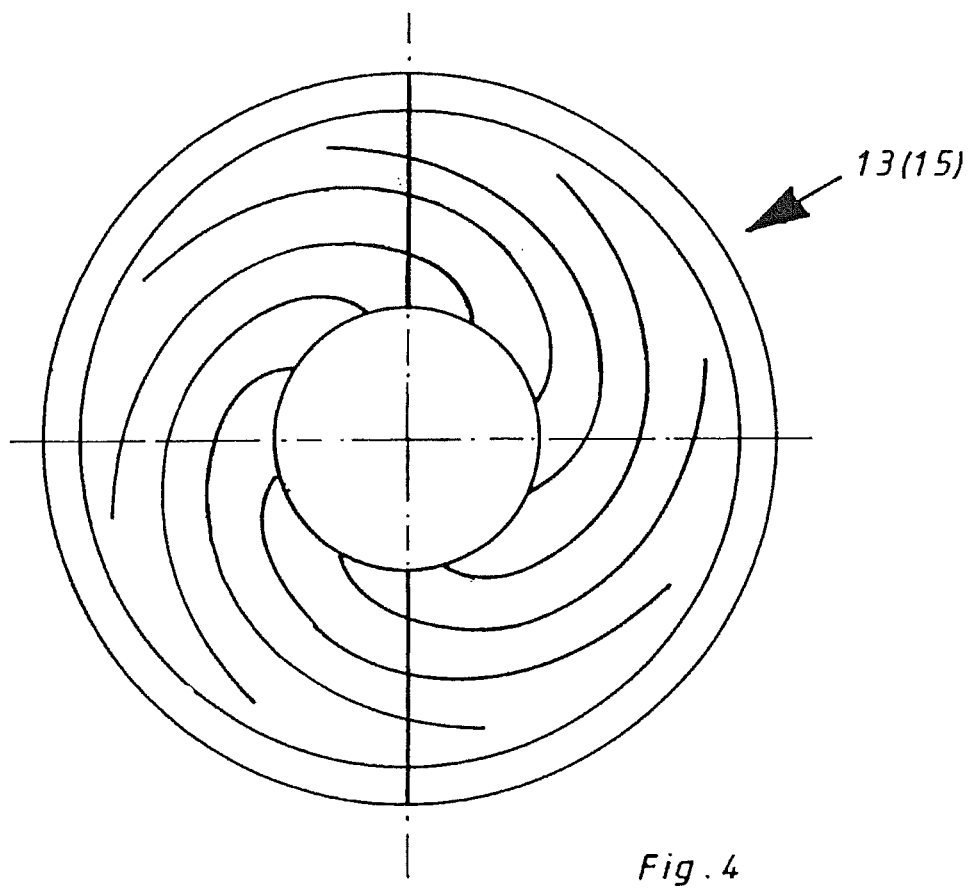
FIG. 4 a plan view of a Siegbahn pump stage.

FIG. 4 shows a Siegbahn pump stage 13. The Siegbahn pump stages 13, 15 according to FIGS. 1 through 3 are formed with pump-active surfaces which extend transverse to the rational axis of the rotor.

Figure 5:
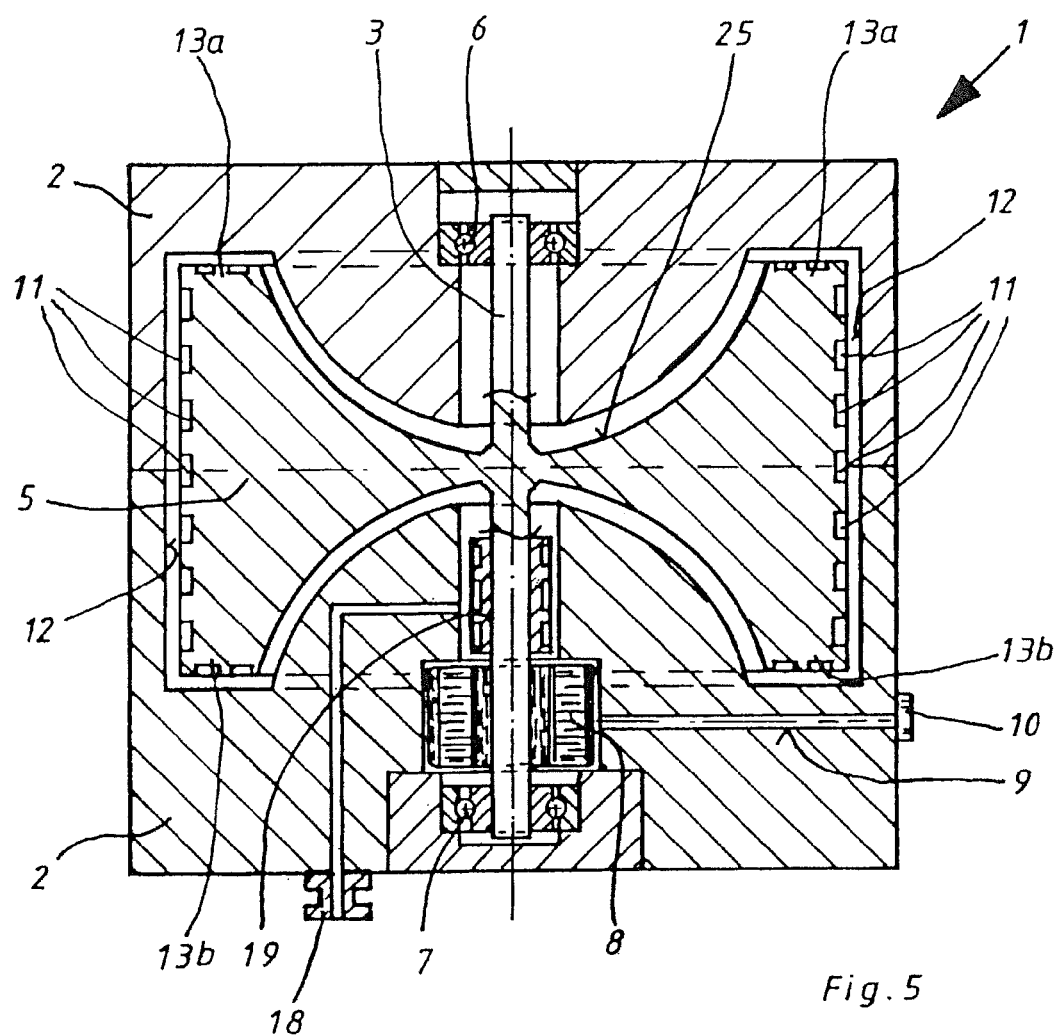
FIG. 5 a longitudinal cross-sectional view of still another embodiment of an apparatus according to the present invention.

FIG. 5 shows an apparatus 1 with the housing 2, rotor shaft 3, bearings 6 and 7, and an electrical machine 8.

The electrical leadthrough 9 to the electrical connection 10 and the outlet 18 are analogous to those in the embodiment of FIG. 1.

The flywheel body 5 is secured directly on the rotor shaft 3. The flywheel body 5 has, in addition, a cross-section that expands from the rotor shaft 3 radially outwardly. In the gap between the rotor and the stator which extends from the rotor shaft 3 to the Siegbahn pump stage 13a, further pump stages can be integrated by providing grooves in the rotor and/or in the corresponding stator surfaces. The flywheel body 5 is again is provided with channels 11 which form, together with the inner wall 12 of the housing 2, a screw-type pump stage. In addition, there are provided Siegbahn pump stages 13a, 13b. Additionally, a screw-type pump stage 19 is arranged on the rotor shaft 3. The advantage of this embodiment consists in that the flywheel body has a very large mass.

Figure 6:
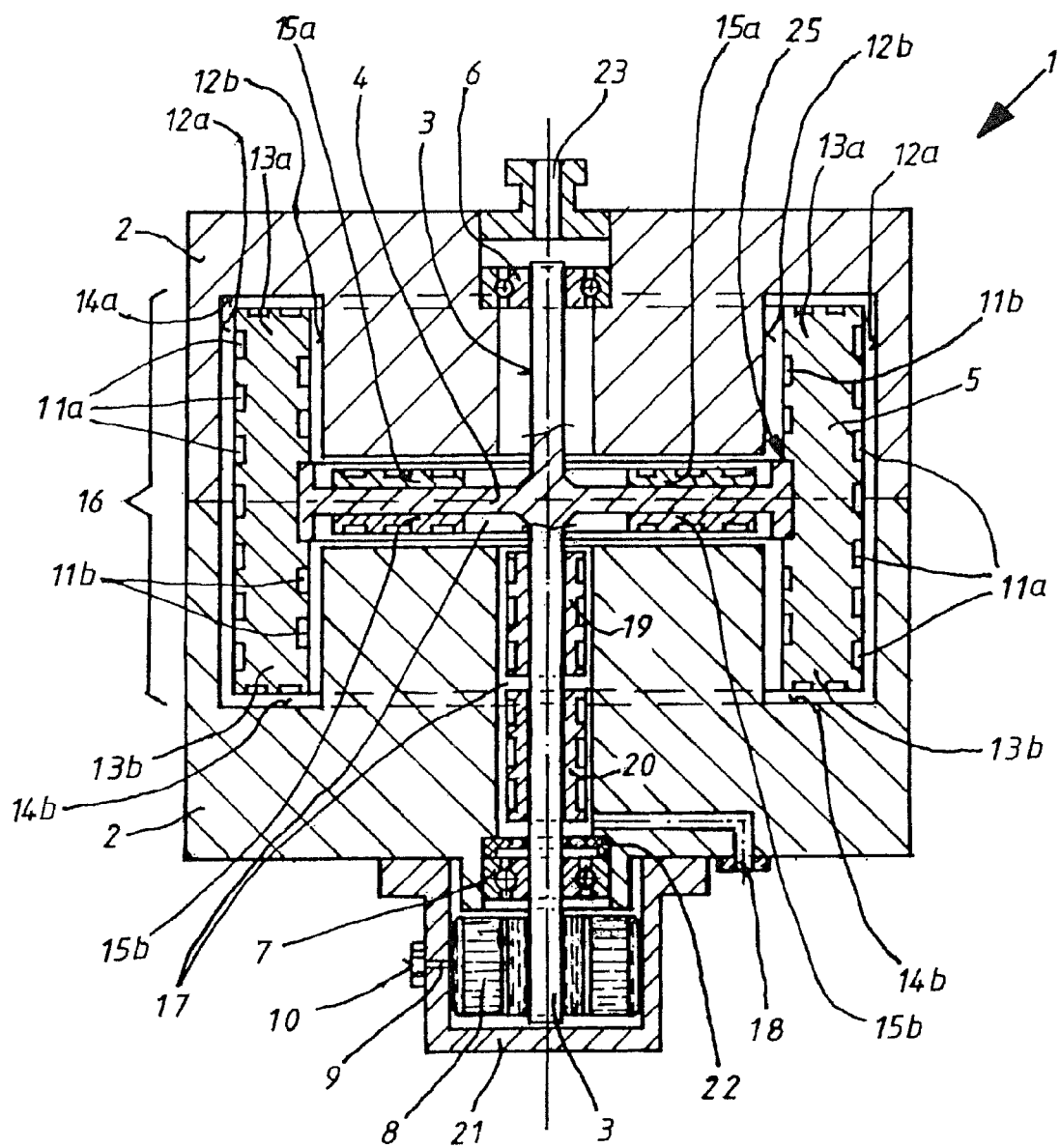
FIG. 6 a longitudinal cross-sectional view of a further embodiment of an apparatus according to the present invention.

FIG. 6 shows an embodiment of an apparatus 1. The components common with those of FIGS. 1, 2, 3 and 5 are not described in detail, only essential changes are.

According to FIG. 6, the apparatus has, in addition to the outlet 18, a further outlet 23. The gas feeding direction starts at the middle of the screw-type pump stage/Holweck pump stage 16, with the gas being partially transported to the Siegbahn pump stage 13a and partially to the Siegbahn pump stage 13 and, finally, in direction of the outlets 18, 23.

Figure 7:
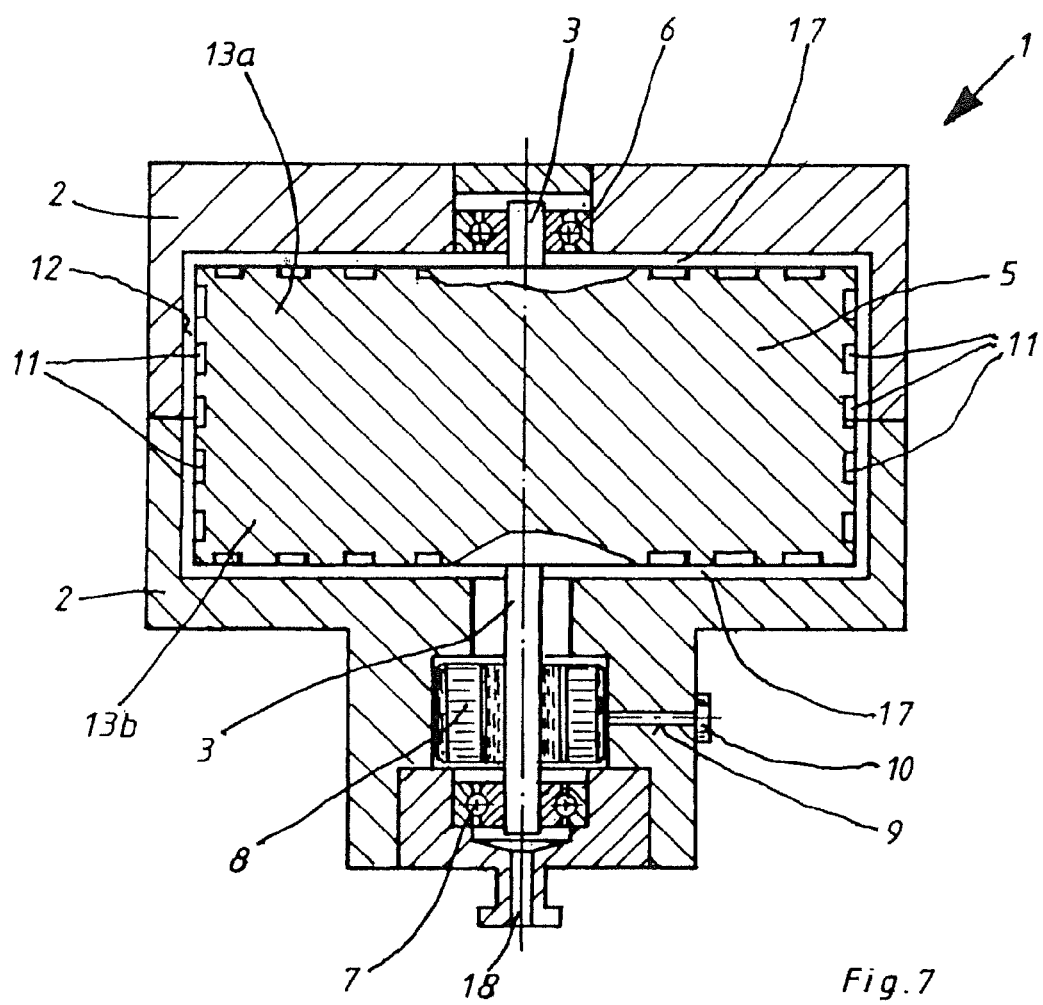
FIG. 7 a longitudinal cross-sectional view of a yet further embodiment of an apparatus according to the present invention.

FIG. 7 shows a further apparatus 1 with a housing 2. A hollow space 17 is provided in the housing 2. The apparatus 1 includes a rotor shaft 3 which is supported in bearings 6, 7.

In addition, there is provided an electrical machine 8, with an electrical leadthrough 9 to an electrical connection 10. The flywheel body 5 is formed as a solid cylinder. The solid cylinder has a very big mass. The hollow cylinder has, on its outer side, channels 11 which form a screw-type pump stage.

Through the outlet 18, the flywheel body 5 aspirated vacuum into the hollow space 17.

The outlet 18 can be provided at another location. It is also possible to arrange the electrical machine 8 and the bearing 7 outside the housing 2. In addition, Siegbahn pump stages 13a, 13b are provided on the flywheel body 5.

Figure 8:
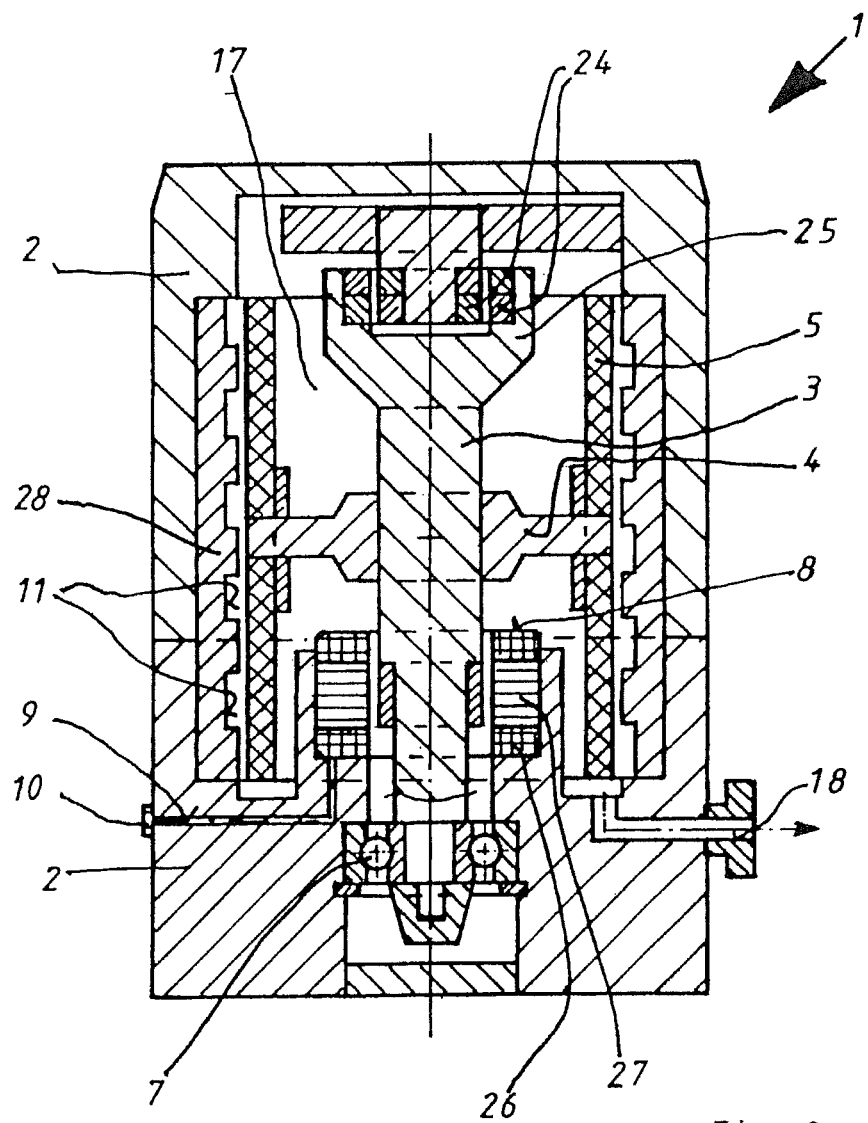
FIG. 8 a longitudinal cross-sectional view of a still further embodiment of an apparatus according to the present invention.

FIG. 8 shows yet another embodiment of an apparatus 1 having a housing 2, a rotor shaft 3 rotatably supported in the housing 2 and on which a hub 4 is provided.

The rotor shaft 3 is supported in a magnetic bearing 24 and a ball bearing 7. In addition, there are provided an electrical machine 8 and an outlet 18. In the apparatus 1, there is provided a rotor 25 that is formed of the rotor shaft 3, hub 4, and sleeve 5.

The bearing arrangement formed of the magnetic bearing 24 and the ball bearing 7 has an advantage that consists in that that lubricant-free bearing is provided in the hollow space 17. On the shaft 3, there is provided a permanent magnet 26 that cooperates with an energized drive spool 27. Thereby, the rotor 25 can be rotated with a sufficiently high speed. A stator 28 has on its outer surface adjacent to the rotor one or a plurality of helical channels 11. This embodiment is so formed that the stator 28 carries the channels rather than the flywheel body 5. Thus, a Holweck pump stage is formed.

Though the present invention was shown and described with references to the preferred embodiments those are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An apparatus for kinetic energy storage, comprising an electrical machine operable at least in one of motor mode and generator mode; and at least one energy recovery system for an intermediate storage of a produced kinetic energy and which converts the kinetic energy into an electrical energy, wherein the at least one energy recovery system has at least one flywheel body formed as a rotor, and a stator arranged in an apparatus housing, and wherein at least one of the rotor and the stator is formed as at least one vacuum pump stage, wherein the flywheel body has pump-active surfaces which are formed parallel to a rotational axis as a Holweck pump stage, a screw-type pump stage or as cross-channel pump stage, and pump-active surfaces which are formed transverse to the rotational axis analogous to a Siegbahn pump stage, and wherein the flywheel body has a transverse axis extending transverse to the rotational axis and a cross-section continuously widening radially outwardly with respect to the transverse axis thereof along an entire extent of the cross-section in a direction parallel to the transverse axis.

2. An apparatus according to claim 1, wherein the at least one of the rotor and the stator is formed as at least one of Holweck-pump stage, Siegbahn pump stage, cross-channel pump stage, and screw-type pump stage.

3. An apparatus according to claim 1, wherein the flywheel body is secured on a hub, the hub is arranged on the rotor shaft, and on at least one of the hub and the rotor shaft, there is additionally provided at least one of Siegbahn pump stage, Holweck pump stage, screw-type pump stage, and a cross-channel pump stage.

4. An apparatus according to claim 1, wherein the flywheel body is formed as one of metal and carbon fiber-reinforced plastic material and carbon fiber-reinforced plastic material.

5. An apparatus according to claim 1, wherein the flywheel body is secured directly on the rotor shaft, with the flywheel body cross-section widening radially outwardly starting from the rotor shaft.

* * * * *